United States Patent Office 2,977,382
Patented Mar. 28, 1961

2,977,382

METHOD OF PREPARING ESTERS OF PHOSPHORODITHIOIC ACIDS

Allen F. Millikan, Crystal Lake, Ill., assignor to The Pure Oil Company, Chicago, Ill., a corporation of Ohio No Drawing. Filed Dec. 12, 1957, Ser. No. 702,227

20 Claims. (Cl. 260—461)

This invention relates to a method of preparing esters of phosphorodithioic acids by direct reaction of the phosphorodithioic acid with an organic halide in the presence of ammonia.

There are numerous references including the article by Norman, Le Suer and Mastin, J. Am. Chem. Soc. 74, 161, 1952; Smalhen and Mastin, Petroleum Processing, December 1952; Pritzker, National Petroleum News, vol. 37, No. 49, December 5, 1945; Kosolapoff, "Organo Phosphorus Compounds," Wiley, 1950, 236; and U.S. Patents 2,432,095; 2,589,675; 2,063,629; 2,589,675, which show the step-wise production of esters of thiophosphoric acids and related compounds, involving the general steps of reaction of an alcohol with a phosphorus sulfide to form the dithioic acid, conversion of the acid to a metal salt or other derivative, and subsequent transformation of the salt to an alkyl ester. A similar sequence of steps takes place in the production of alkyl esters of phosphoroamidodithioic acids where a primary or secondary amine is used as the reactant in place of the alcohol. Certain of these methods require recrystallization of the salt, precipitation of halide complexes involved in the reaction, filtration and other sequential steps. One reason for the conversion of the acid to the salt is that the free acid-esters are fairly readily attached by oxidative-hydrolytic action of aqueous reagents on exposure to the atmosphere. In general, these reactions to form the esters may be shown to involve the following steps, using an alcohol as an example.

(1) $4ROH + P_2S_5 \rightarrow 2(RO)_2PSSH + H_2S$
(2) $(RO)_2PSSH + NaOH \rightarrow (RO)_2PSSNa + H_2O$
(3) $(RO)_2PSSNa + XR' \rightarrow (RO_2)PSSR' + NaX$ According to this invention, it has been discovered that the transformation of the dithioic acid directly to the organoester can be accomplished by reaction thereof with an organic halide in the presence of ammonia, thus eliminating one step of the prior art. The present process reduces to (1) $4ROH + P_2S_5 \rightarrow 2(RO)_2PSSH + H_2S$
(2) $(RO)_2PSSH + NH_3 + R'X \rightarrow (RO)_2PSSR' + NH_4X$ When using a primary amine such as aniline as the starting material, the following reactions illustrate the invention:

(1) $4C_6H_5NH_2 + P_2S_5 \longrightarrow 2(C_6H_5NH)_2\overset{S}{\overset{\|}{P}}-SH + H_2S$ (2) $(C_6H_5NH)_2\overset{S}{\overset{\|}{P}}-SH + R'X + NH_3 \longrightarrow (C_6H_5NH)_2\overset{S}{\overset{\|}{P}}-SR' + NH_4X$ Further, it has been found that quaternary ammonium salts of diesters of phosphorodithioic acids may be prepared in this manner. Accordingly, it becomes a primary object of this invention to provide a process for the preparation of organo-esters of phosphorodithioic acids by direct reaction of the acid with an organo-compound in the presence of ammonia. Another object of the invention is to provide a simple process for preparing organo-esters of phosphorodithioic acids which eliminates certain prior art steps heretofore considered necessary. A further object of the invention is to provide a process for producing quaternary ammonium salts of diesters of phosphorodithioic acids. The phosphorodithioic acid esters of this invention fall within the general formula:

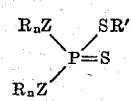

wherein R may be hydrogen, alkyl groups of 1 to 25 carbon atoms, or aryl, alkylaryl, and arylalkyl groups of from 6 to 25 carbon atoms, R' is an organic group which may be alkyl, alkylaryl, arylalkyl or aryl group containing from 1 to 25 carbon atoms, containing or not containing a substituent group such as an hydroxyl, nitro, cyano or sulfo radical, a quaternary ammonium group, and Z may be oxygen with $n$ having a value of 1, or nitrogen with $n$ having a value of 2. In the compounds coming within the above formula and definition are O,O-disubstituted phosphorodithioates and N,N'-polysubstituted diamidodithioates. The alkyl groups may be the same or different, that is, the compounds may be dialkyl, diaryl, dialkaryl, diaralkyl, or aryl-alkyl esters.

The phosphorodithioic acids are prepared by reacting an alcohol with phosphorus pentasulfide. For this purpose methyl alcohol, ethyl alcohol, propyl alcohol, isopropyl alcohol, butyl alcohol, isobutyl alcohol, sec-butyl alcohol, tertiary butyl alcohol, n-amyl alcohol, sec-butylcarbinol, isoamyl alcohol, neopentyl alcohol, methylpropylcarbinol, methylisoamylcarbinol, tert-amyl alcohol, 2-methylpentanol-1, 3-methylpentanol-1, isohexyl alcohol, 2-ethylbutanol-1, tert-amylcarbinol, neopentylcarbinol, 2,3-dimethylbutanol-1, hexanol-3, 3-methylpentanol-2, methylisobutylcarbinol, ethylisopropylcarbinol, pinocolyl alcohol, 2-methylpentanol-2, methyldiethylcarbinol, dimethylisopropylcarbinol, n-heptyl alcohol, diisopropylcarbinol, pentamethylethanol, octanol-1, capryl alchol, 2-ethylhexanol-1, lauryl alcohol, phenol and methylphenol.

The phosphorodiamidodithioic acids are prepared by reacting primary or secondary amines with phosphorus pentasulfide. Useful amines include the methylamines, the ethylamines, aniline, m-benzylaniline, p-benzylaniline, benzylamine, propylamine, isopropylamine, dipropylamine, di-isopropylamine, butylamine, dibutylamine, isobutylamine, di-isobutylamine, pentylamine, isopentylamine, isoamylamine, p-isopropylaniline, dodecylamine, and the like. The reaction between primary or secondary amines and $P_2S_5$ results in phosphorodiamidodithioates which may be used as intermediates for preparing the subject compounds. Mixed diamides are obtained when dialkyl amines react with $P_2S_5$ at about 130° C.

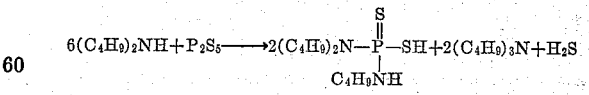

With primary amines, symmetrical diamides can be prepared. Aniline reacts with $P_2S_5$ at 30° C. to give N,N'-diphenylphosphorodiamidodithioic acid:

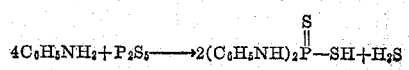

The products resulting from the reaction of the alcohol or the amine with phosphorus pentasulfide, after separation and purification, or in their semi-pure state, are reacted with an organic halide of the following formula:

R'X wherein R' is an organic radical as heretofore defined and X is a halogen, particularly chlorine, bromine or iodine. Fluorides may be used but the reaction is much slower. The R' group may contain various substitutent groups as before defined. Where R' is an alkyl group, the monohalogen derivatives of paraffinic hydrocarbons are intended by the foregoing formulas, such as methyl fluoride, methyl chloride, methyl bromide, methyl iodide, ethyl fluoride, ethyl chloride, ethyl bromide, ethyl iodide, n-propyl fluoride, n-propyl chloride, n-propyl bromide, n-propyl iodide, sec-butyl chloride, isobutyl bromide, tert-butyl iodide, n-amyl chloride, tert-amyl bromide, neopentyl iodide, n-hexyl chloride, n-hexyl bromide, n-hexyl iodide, n-heptyl fluoride, n-heptyl chloride, n-heptyl bromide, n-heptyl iodide, n-octyl fluoride, n-octyl chloride, n-octyl bromide, and n-octyl iodide.

Where R' is an aryl group, it is preferred that there be activating substituents; examples include p-nitrophenyl chloride, 2,4-dinitrophenyl bromide, o-phenyl acetate, etc. Such compounds as benzyl chloride, benzyl iodide, benzyl bromide, diphenylchloromethane, triphenylchloromethane, and triphenylbromomethane are intended where R' is an arylalkyl group. Other examples include para-nitrobenzyl chloride, alpha-chloroacetamide, alpha-chloro N-(hydroxymethyl) acetamide, etc. Where R' is a quaternary ammonium group, the halogen X is attached to the nitrogen in such compounds as octyl trimethyl ammonium bromide, cetyl trimethyl ammonium bromide, and N-benzyl-hexamethylenetetramine chloride.

In order to illustrate the invention, the following examples are given:

EXAMPLE 1

*Preparation of carbamylmethyl O,O'-di-2-ethylhexyl phosphorodithioate*

O,O'-di-2-ethylhexyl phosphorodithioic acid was prepared as follows: 195 g. (1.5 moles) of 2-ethylhexanol, 195 g. of toluene, and 195 g. of solvent-refined, 85 vis. neutral oil were charged to a one-liter flask mounted over steam and fitted with stirrer and thermometer. Eightly three and a half grams (0.38 mole) of phosphorus pentasulfide were added slowly over a five minute period. The reaction mixture was stirred for 4 hours at approximately 90° C. At the end of this time, the solution, which had become clear, was filtered. Acidity measurements indicated the presence of approximately 0.75 mole of the product as predicted by theory.

Then 0.13 mole of the acid thus prepared and 11.7 g. (0.13 mole) of alpha-chloroacetamide were charged to a 250 ml. flask, which was fitted with a mechanical stirrer. Excess ammonia was then bubbled through the reaction mixture over a 1.5 hour period with stirring. Heat was generated at first and there was an immediate formation of a white ammonium chloride precipitate. The product was filtered through celite and vacuum-nitrogen stripped. Analysis of product (calculated for 61 wt. percent of $C_{18}H_{38}ONPS_2$ in mineral oil solution): N, 2.1% w.; P, 4.6% w.; S, 9.5% w. Found: N, 1.9% w.; P, 4.8% w.; S, 8.8% w.

EXAMPLE 2

*Preparation of benzyl O,O'-diphenyl phosphorodithioate*

O,O'-diphenyl phosphorodithioic acid was prepared in the following manner.

Exactly 376 g. (4.00 moles) of phenol, 376 g. of solvent-refined, 85 vis. neutral, and 450 ml. of toluene were charged to a three-liter flask equipped with stirrer and thermometer and mounted over steam, and 222.3 g. (1.0 mole) of phosphorus pentasulfide were added slowly over a five minute period. The reaction proceeded with stirring for 20 hours at a temperature of 90±2° C. The product was then filtered. Acidity measurements indicated that approximately 2 moles of O,O'-diphenyl phosphorodithioic acid had been produced as predicted by theory.

Then 0.68 mole of the O,O'-diphenyl phosphorodithioic acid thus produced and 86.8 g. (0.72 mole) of benzyl chloride were charged to a 500 ml. flask equipped with a stirrer. As the reaction mixture was stirred, excess ammonia was bubbled through over a two-hour period. Heat was evolved immediately and a precipitate of ammonium chloride formed within 10 minutes. The product was filtered through celite and vacuum-nitrogen stripped. After stripping, the lower phase was separated as product.

*Analysis.*—Theory: P, 8.3% w.; S, 17.2% w. Found: P, 7.8% w.; S, 15.7% w.

EXAMPLE 3

Ammonium O,O'-diphenyl phosophorodithioate was was prepared as follows: 0.162 mole of the O,O'-diphenyl phosphorodithioic acid (prepared in Example 2) was charged to a 500 ml. flask. Ammonia gas was bubbled through the acid with stirring. In a short time, two phases appeared. During the first hour a good bit of heat evolved. After two and a half hours of reaction, the product was vacuum-nitrogen-stripped to remove solvent and excess ammonia.

The two-phase product thus prepared, theoretically 0.162 mole of ammonium O,O'-diphenyl phosphorodithioate, was charged to a 500 ml. flask and stirred while 21.1 g. (0.167 mole) of benzyl chloride were slowly added. There was some generation of heat. The mixture was stirred for two and one half hours and then filtered. The solid phase recovered weighed 35.9 g., obviously more than the 8.9 g. of ammonium chloride theoretically possible. Qualitative ashing strongly suggested the presence of a concentration of phosphorus. The filtrate, after stripping, weighed 70.7 g., and contained 2.8 wt. percent chlorine according to analysis, indicating that at least 34 wt. percent of the benzyl chloride charged was unreacted.

EXAMPLE 4

To 0.124 mole of O,O'-diphenyl phosphorodithioic acid (prepared in Example 2) were added 98.3 g. (1.24 moles) of pyridine and 15.8 g. (0.125 mole) of benzyl chloride. The reaction mixture was then allowed to stand sixteen hours at room temperature. At no time was there a separation of solid pyridine hydrochloride. Since pyridine hydrochloride and pyridine are reported to be soluble and infinitely soluble, respectively, in water, water washing was employed. A three-phase system resulted, but of this system, only the top phase was oil-soluble. Vacuum-nitrogen stripping of this phase yielded 42.0 g. of product that analyzed: <0.1 wt. percent chlorine, 6.8 wt. percent nitrogen, 1.2 wt. percent phosphorus, 2.6 wt. percent sulfur. From this analysis, it appears that only a fraction (10–15%) of the desired product (benzyl O,O'-diphenyl phosphorodithioate) was present, and that it was diluted with a large amount of pyridine. The failure of pyridine hydrochloride to separate probably eliminates this as a practical preparative process.

Examples 1 and 2 clearly illustrate the improved results of this invention. From the results of Example 3 it is seen that the reaction cannot proceed from the ammonium salt, and that an excess of ammonia is required to initiate the reaction herein contemplated. Example 4 shows that pyridine, a known acceptor for hydrogen chloride, is not the equivalent of ammonia for this reaction. Example 4 also shows that the accelerator should be added after the addition of the R'X reactant.

The procedure of Examples 1 and 2 was repeated using a number of dithioic acids and R'X compounds as reactants to further illustrate the results obtainable, as shown by the following table:

PREPARATION OF SUBSTITUTED DITHIOATES IN THE PRESENCE OF NH₃

| Reactants and Reaction $(RZ)_n\text{—P(=S)—SH} + R'X$ | | Product | Analysis of Product | | | | | |
|---|---|---|---|---|---|---|---|---|
| | | | Theory | | | Found | | |
| | | | N | P | S | N | P | S |
| (5) O,O'-Di-2-ethylhexyl dithiophosphoric acid* $(C_8H_{17}O)_2P(S)SH$ | Cetyltrimethylammonium bromide $(C_{16}H_{33})(CH_3)_3NBr$ | Cetyltrimethylammonium O,O',Di-2-ethylhexyl phosphorodithioate* $(C_{16}H_{33})(CH_3)_3SP(S)(OC_8H_{17})_2$ | 1.6 | 3.5 | 7.1 | 1.4 | 3.2 | 6.8 |
| (6) O,O'-Di-n-hexyl dithiophosphoric acid* $(C_6H_{13}O)_2P(S)SH$ | Methyl iodide $CH_3I$ | Methyl O,O'-Di-n-hexyl phosphorodithioate* $CH_3SP(S)(OC_6H_{13})_2$ | | 5.9 | 12.4 | | 5.9 | 12.0 |
| (7) O',O'-Diamyl dithiophosphoric acid* $(C_5H_{11}O)_2P(S)SH$ | Benzyl chloride $C_6H_5CH_2Cl$ | Benzyl O,O'-diamyl phosphorodithioate* $C_6H_5CH_2SP(S)(OC_5H_{11})_2$ | | 5.8 | 11.9 | | 5.7 | 11.9 |
| (8) O,O'-Di-2-ethylhexyl dithiophosphoric acid $(C_8H_{17}O)_2P(S)SH$ | N - Benzyl - Hexamethylene-tetramine chloride $C_6H_{12}N_4C_6H_5CH_2Cl$ | N - Benzyl - Hexamethylenetetramine O,O'-di-2-ethylhexyl phosphorodithioate $C_6H_{12}N_4C_6H_5CH_2SP(S)(OC_8H_{17})_2$ | 9.6 | 5.3 | 11.0 | 10.3 | 5.8 | 10.2 |
| (9) O,O'-Di-2-ethylhexyl dithiophosphoric acid* $(C_8H_{17}O)_2P(S)SH$ | p-Nitrobenzyl chloride $C_6H_4(NO_2)CH_2Cl$ | p-Nitrobenzyl O,O'-Diethyl hexyl phosphorodithioate* $C_6H_4(NO_2)CH_2SP(S)(OC_8H_{17})_2$ | 1.9 | 4.1 | 8.6 | 2.3 | 4.0 | 8.2 |

\* These products were prepared from acids that were diluted with a weight of neutral oil equal to the original charge of alcohol. Therefore, the product was also diluted with this amount of oil. The theoretical compositions were computed taking into account this dilution.

The O,O'-disubstituted phosphorodithioic acids or the N,N'-polysubstituted diamidophosphorodithioic acids of this invention may be prepared by conducting the reactions indicated at temperatures ranging from —20° to 120° C. at atmospheric, sub-atmospheric pressures and super-atmospheric pressures. Temperatures between about 20° to 100° C. are preferred. In general, it is preferred to use stoichiometric amounts of the phosphorodithioic acid and the organo-halide, in the presence of an excess of ammonia. By an excess of ammonia is meant between about 50 mol percent to 500 mol percent in excess of the amount necessary to neutralize the acid. However, an excess of organo-halide may be used with stoichiometric amounts of ammonia, based on the acid. While the halogen in the organo-halide may be selected from the group of bromine, chlorine, iodine and fluorine, the iodo- and bromo-compounds are preferred because of their uniform reactivity and ease in conducting the reaction when using same. While the invention has been described in relation to the use of a lubricating oil fraction as a vehicle during the reaction, such procedure is merely convenient and not necessary to the success of the reaction.

The procedure of this invention is advantageous in that the use of a solid alkaline base is avoided, one step of the prior art is omitted, it is mechanically advantageous to use a gaseous reactant rather than a solid alkaline base, there is no water by-product formed which tends to cause hydrolysis of the end product, and the excess of ammonia used is easily recovered for re-use.

The products of this invention are useful as lubricating oil additives, as ore flotation agents, as pesticides, corrosion inhibitors and plasticizers.

The esters of phosphorodithioic acids of this invention may also be used in combination with insecticides such as dodecyl thiocyanate, lead arsenate, nicotine and rotenone, and the like, with various plant foods, fertilizers and fungicides.

Although the invention has been described by reference to certain specific examples, these are not intended to be limiting and the invention is to be restricted solely by the scope of the appended claims.

What is claimed is:

1. A method of preparing phosphorodithioic esters of the general formula

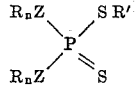

in which R is selected from the group consisting of hydrogen, alkyl radicals having from 1 to 25 carbon atoms, aryl, alkaryl, and aralkyl radicals having from 6 to 25 carbon atoms and their mixtures, R' is an organic radical containing from 1 to 25 carbon atoms selected from the group consisting of alkyl, aryl, alkaryl, aralkyl, carbamylmethyl, octyltrimethylammonium, cetyltrimethylammonium, and N-benzyl-hexamethylenetetramine radicals, Z is selected from the group of oxygen and nitrogen and $n$ has a value of 1 when Z is oxygen and a value of 2 when Z is nitrogen, which includes the steps of reacting the corresponding phosphorodithioic acid under substantially anhydrous conditions with an organic halide of the general formula

R'X wherein X is a halide and R' is an organic radical as heretofore defined, and conducting said reaction by passing therethrough an excess of the stoichiometric amount of anhydrous ammonia necessary to neutralize said dithioic acid and separating said phosphorodithioic ester from the reaction products.

2. The method in accordance with claim 1 in which said reaction is conducted at a temperature between about —20° to 120° C., said ammonia is present in an amount ranging from about 50 mol percent to 500 mol percent in excess of stoichiometric requirements to neutralize said dithioic acid, and said ammonia is added after the addition of said organic halide.

3. The method in accordance with claim 1 in which Z is oxygen, $n$ is equal to 1 and said reaction is conducted at a temperature of about 20° to 100° C.

4. The method in accordance with claim 1 in which Z is nitrogen, $n$ is equal to 2 and said reaction is conducted at a temperature of about 20° to 100° C.

5. The method in accordance with claim 1 in which R is an alkyl group having from 1 to 25 carbon atoms, Z is oxygen and $n$ is equal to one.

6. The method in accordance with claim 5 in which R is the 2-ethylhexyl group.

7. The method in accordance with claim 1 in which R is an aryl group having from 6 to 25 carbon atoms, Z is oxygen and $n$ is equal to one.

8. The method in accordance with claim 7 in which R is a phenyl group.

9. The method in accordance with claim 1 in which R' is the carbamylmethyl group.

10. The method in accordance with claim 1 in which R'X is alpha-chloroacetamide.

11. The method in accordance with claim 1 in which R'X is cetyltrimethylammonium bromide.

12. The method in accordance with claim 1 in which R'X is methyl iodide.

13. The method in accordance with claim 1 in which R'X is benzyl chloride.

14. The method in accordance with claim 1 in which R'X is N-benzyl-hexamethylenetetramine chloride.

15. The method of preparing carbamylmethyl O,O'-di-2-ethylhexyl phosphorodithioate which includes the step of reacting together O,O'-di-2-ethylhexyl phosphorodithiotic acid and alpha-chloroacetamide under substantially anhydrous conditions by passing therethrough a stoichiometric excess of anhydrous ammonia based on said acid.

16. The method of preparing benzyl O,O'-diphenyl phosphorodithioate which includes the step of reacting together O,O'-diphenyl phosphorodithioic acid and benzyl chloride under substantially anhydrous conditions by passing therethrough an excess of anhydrous ammonia, based on said acid, over the stoichiometric amount required to neutralize the acid.

17. The method of preparing cetyltrimethylammonium O,O'-di-2-ethylhexyl phosphorodithioate which includes the step of reacting together O,O'-di-2-ethylhexyl dithiophosphoric acid and cetyltrimethylammonium bromide under substantially anhydrous conditions by passing therethrough an excess of anhydrous ammonia based, on said acid, over the stoichiometric amount required to neutralize the acid.

18. The method of preparing methyl O,O'-di-n-hexyl phosphorodithioate which includes the step of reacting together O,O'-di-n-hexyldithiophosphoric acid and methyl iodide under substantially anhydrous conditions by passing therethrough an excess of anhydrous ammonia, based on said acid, over the stoichiometric amount required to neutralize the acid.

19. The method of preparing benzyl O,O'-diamyl phosphorodithioate which includes the step of reacting together O,O'-diamyl dithiophosphoric acid and benzyl chloride under substantially anhydrous conditions by passing therethrough an excess of anhydrous ammonia, based on said acid, over the stoichiometric amount required to neutralize the acid.

20. The method of preparing N-benzyl hexamethylene tetramine O,O'-di-2-ethylhexyl phosphorodithioate which includes the step of reacting together O,O'-di-2-ethylhexyl dithiophosphoric acid and N-benzyl-hexamethylenetetramine chloride under substantially anhydrous conditions by passing therethrough an excess of anhydrous ammonia, based on said acid, over the stoichiometric amount required to neutralize the acid.

References Cited in the file of this patent

UNITED STATES PATENTS

| | | |
|---|---|---|
| 2,114,866 | Vaughn | Apr. 19, 1938 |
| 2,266,514 | Romieux et al. | Dec. 16, 1941 |
| 2,627,523 | Hook et al. | Feb. 3, 1953 |
| 2,678,940 | Boyer et al. | May 18, 1954 |
| 2,862,017 | Schrader et al. | Nov. 25, 1958 |
| 2,864,849 | Schrader | Dec. 16, 1958 |
| 2,894,973 | Schrader | July 14, 1959 |
| 2,915,546 | Lorenz et al. | Dec. 1, 1959 |
| 2,923,730 | Schrader | Feb. 2, 1960 |